Figure 1:
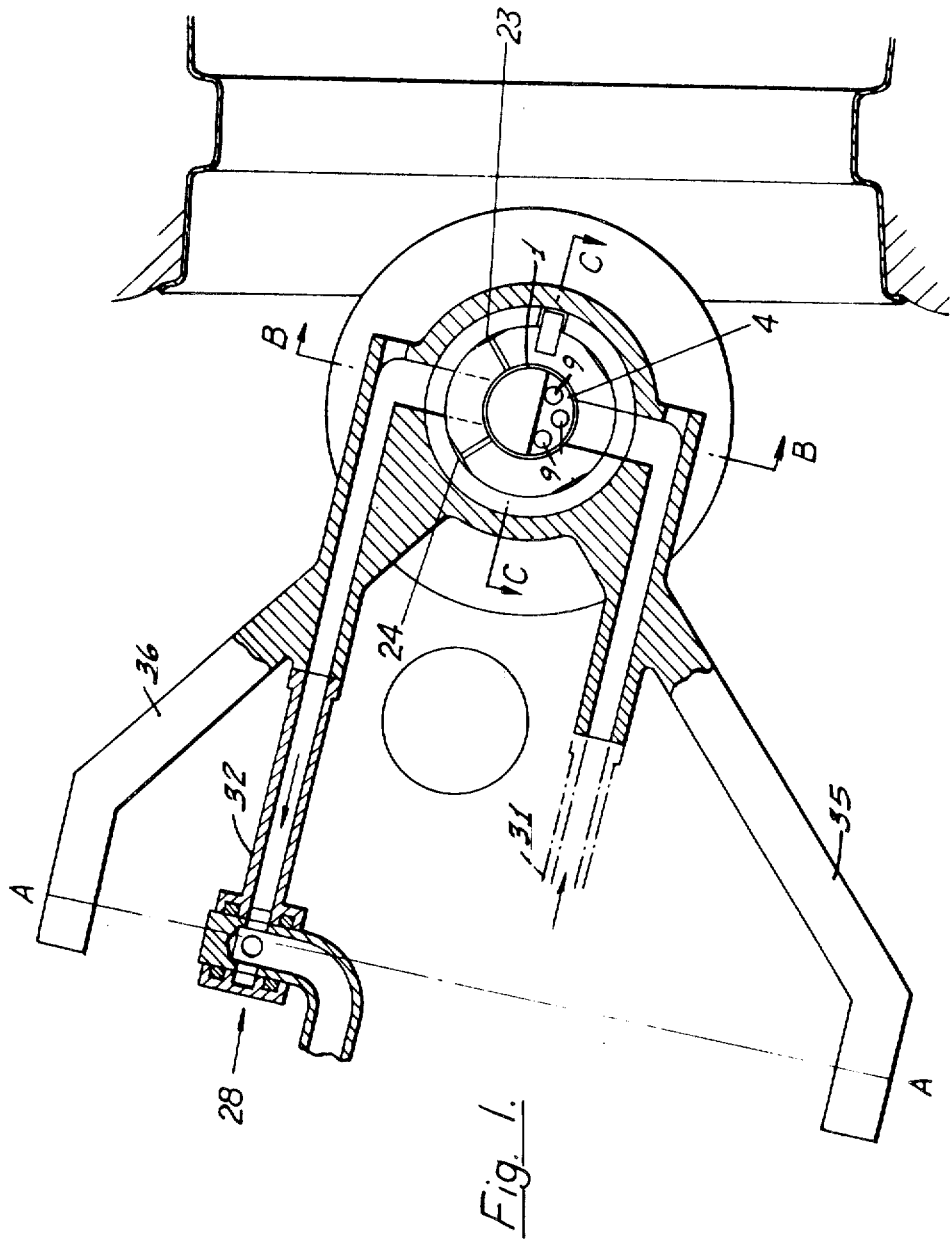

United States Patent

[11] 3,612,204

[72] Inventor Arthur Frederick Allen
     Littleover, Derby, England
[21] Appl. No. 813,818
[22] Filed Apr. 7, 1969
[45] Patented Oct. 12, 1971
[73] Assignee Rolls-Royce Limited
     Derby, England
[32] Priority Apr. 15, 1968
[33] Great Britain
[31] 16382/68

[54] VEHICLE WHEEL SUSPENSION
     18 Claims, 9 Drawing Figs.
[52] U.S. Cl. .................................................. 180/43 R,
                                            180/66 F, 280/96.2
[51] Int. Cl. ................................................... B60k 17/30
[50] Field of Search .......................................... 280/96.2,
     124 F, 124.1; 267/64, 65; 180/43, 66 R, 66 F, 46,
                                                         47, 48

[56]            References Cited
           UNITED STATES PATENTS
3,074,736  1/1963  Krizman ...................... 280/96.1
3,156,481  11/1964 Dangauthier ................ 280/6
3,261,620  7/1966  Cadiou ........................ 280/96.2
2,558,562  6/1951  Hutton ........................ 180/45
3,192,868  7/1965  Wahlmark .................... 180/66 F UX
3,225,855  12/1965 Sherwen ...................... 180/43
3,480,099  11/1969 Nighswonger et al. ....... 180/44

Primary Examiner—Benjamin Hersh
Assistant Examiner—Leslie J. Paperner
Attorney—Cushman, Darby & Cushman ABSTRACT: A vehicle wheel suspension for a wheel having a hydrostatic motor mounted thereon comprises a ball joint between one of the suspension arms and the motor, the ball joint being apertured to allow passage of working fluid between the rotor and the arm.

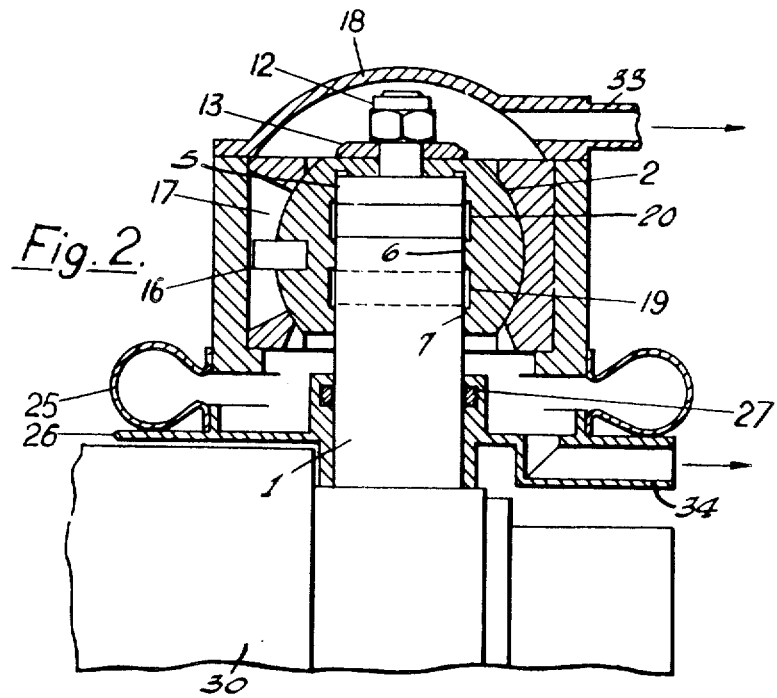
Fig. 2.
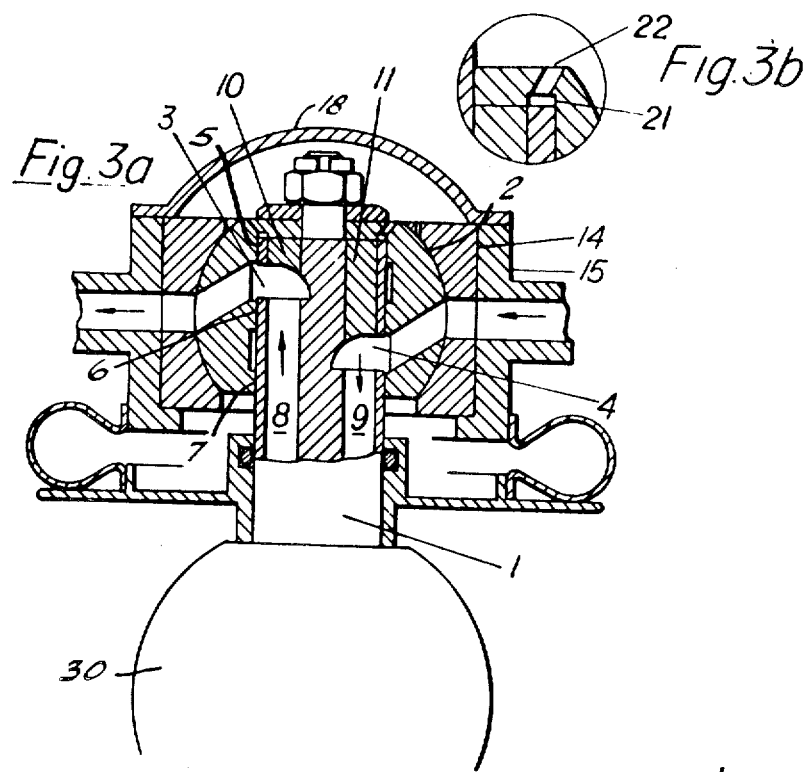
Fig. 3a.
Fig. 3b.
Inventor
ARTHUR FREDERICK ALLEN
By
Cushman, Darby & Cushman
Attorneys

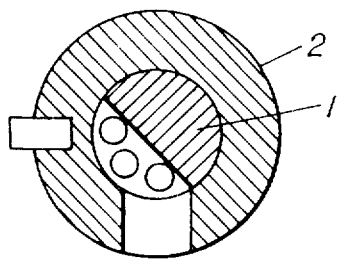
Fig. 4a
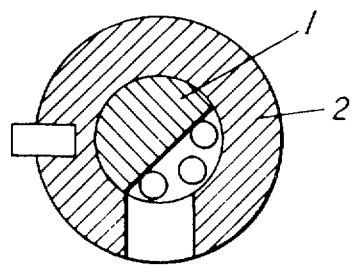
Fig. 4b
Fig. 5.
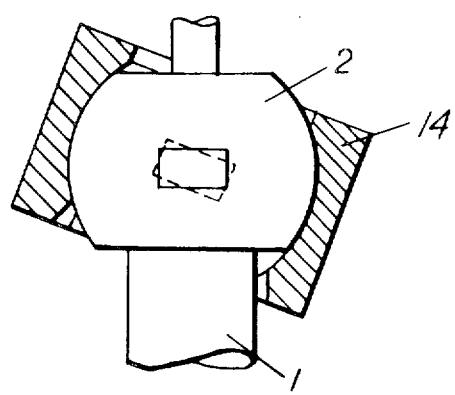
Fig. 6.
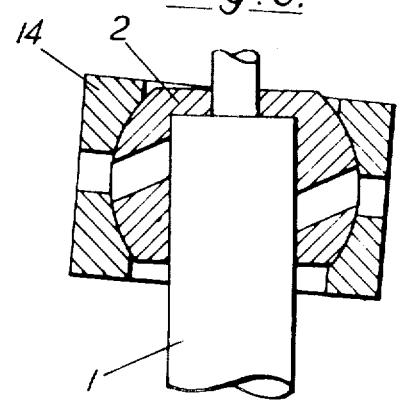

VEHICLE WHEEL SUSPENSION

This invention relates to a vehicle wheel suspension and a ball joint therefor, and is concerned with means for supplying working fluid to a hydrostatic motor mounted directly to the wheel.

In order to achieve suitable vehicle handling qualities the geometries of modern independent wheel suspensions are designed to control the motion of the bracket to which the wheel is fitted and on which in some cases it rotates in three planes. In the first plane which is approximately horizontal the wheel turns together with its bracket and axle to effect the steering action, where such a motion is required. In a second plane, approximately vertical and roughly at right angles to the center line of the vehicle an up and down movement is provided which is controlled by the upper and low suspension linkages and the associated spring and shock absorber system. In the third plane approximately vertical and at right angles to the second plane changes in caster angle occur which are governed by the up and down movement encountered in the second plane.

The present invention provides a means of supplying hydraulic fluid to a hydrostatic motor mounted directly by a wheel which is capable of certain suspension movements, which may be all or some of those outlined above.

According to the present invention a vehicle wheel suspension comprises an hydrostatic motor mounted directly to the wheel, a suspension adapted to permit controlled movement of said wheel and comprising at least one arm pivoted to fixed structure of the vehicle and to said motor, and a ball joint between said arm and said motor adapted to carry flow and/or return of working fluid to said motor while permitting movement of said motor and wheel as allowed by said suspension.

In one embodiment said wheel is a steered wheel of the vehicle.

Said ball joint may be adapted to carry both flow and return of said fluid. Thus said ball joint may comprise a ball enclosed in a housing and corresponding first pairs of ports in said ball and housing disposed at extremities of a diameter of said ball parallel with the pivotting axis of said arm, one said pair of ports carrying flow of fluid while the other carries return.

Preferably said ball comprises a vertical cylindrical hole into which fits a cylindrical pin adapted to carry said fluid and to rotate with respect to said ball to accommodate steering movements of said wheel.

Said ball and pin may be arranged to be pressure balanced by arranging channels and passages for the pressure fluid therein.

Preferably the ball joint is enclosed by members which form enclosed spaces which may be drained to some kind of drain system.

The invention also comprises a ball joint for the vehicle wheel suspension set out in the preceding paragraphs.

The invention will now be particularly described merely by way of example with reference to the accompanying drawings in which -

FIG. 1 is a horizontal section through a wheel and suspension according to the present invention, FIG. 2 is a section on the line 0—0 of FIG. 1, FIG. 3a is a section on the line b—b of FIG. 1, FIG. 3b is an enlarged view of the portion of FIG. 3a enclosed in a circle.

Figure 7:
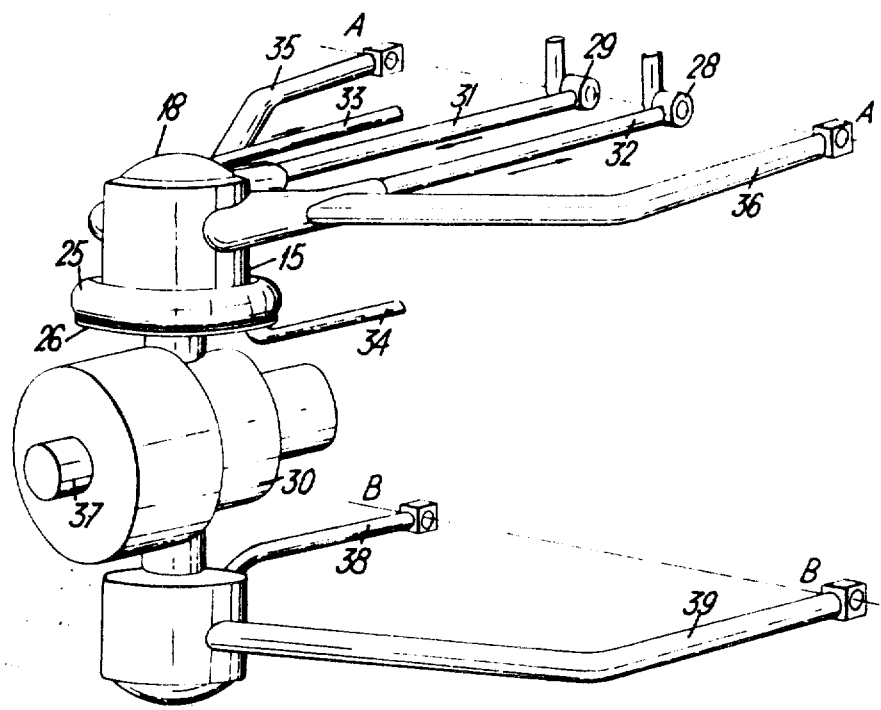

FIG. 4a and 4b comprises sections through the ball joint of FIGS. 1 to 3 in different positions of he steering mechanism, FIG. 5 is an elevation of the ball joint indicating variation of port area with suspension movement in one plane, FIG. 6 is a sectional elevation of the ball joint showing variation of port area due to suspension movement in a second plane, and FIG. 7 is a perspective view of a suspension system according to the invention.

Referring to FIGS. 1, 2 and 3, the hydrostatic motor 30 is provided with a pin 1 which is inserted into a sphere 2 to form part of the special upper ball joint. The upper end of pin 1 is reduced in diameter and provided with a thread. Slots 3 and 4, each having the shape of a segment of a circle are cut into the upper portion of the large diameter of pin 1 and are arranged to be on opposite sides of the pin as indicated in FIG. 3. The slots are displaced axially along the pin to leave a sealing land 5 between the upper slot and the end face of the larger diameter of the pin, another 6 between the two slots and a third 7 below the lower slot. The straight faces of the slots are arranged to be approximately parallel to the line c—c and at right angles to the pivot axis a—a of the upper suspension linkage when the front wheel is in the "straight ahead" steering position. This orientation is shown in FIG. 1.

The slots do not extend as far as the center of the pin 1 and each is connected to internal passages in the motor by one or more holes 8, 9 drilled axially down the pin from the upper face. The upper ends of the holes are sealed by plugs 10, 11. Each slot and its associated holes thus form a duct connecting the upper part of the pin with internal passages in the motor and is completely separate from the other slot and its associated holes.

The pin 1 enters into a closely fitting recess in sphere 2 and the latter is secured to 1 by a nut 12 and washer 13 which allow the pin to rotate relative to the sphere.

The sphere 2 is assembled into a closely fitting spherical housing 14 which is split along line c—c and in turn is fitted tightly into a boss 15 forming part of the upper suspension linkage. The sphere 2 is provided with a radial peg 16 which engages with a slot 17 formed in the split housing 14. This peg prevents rotation of the sphere but allows a rocking motion of each of the axes b—b and c—c.

The split spherical housing 14 is clamped into the boss 15 of the upper suspension linkage by a cover 18.

Passages for the supply and return of fluid to the hydrostatic motor are formed in the upper suspension linkage 35 and 36, boss 15, spherical housing 14 and sphere 2 and connect up with the passages in the pin 1. Details of these passages and their orientation are shown in FIGS. 1 and 3. Rigid pipes 31 and 32 connect from the passages in the upper suspension linkage to suitable swivel joints 28 and 29 mounted on the frame or body of the vehicle these swivels being arranged with their axes coincident with the pivot axis a—a.

In order to balance hydraulic side thrust on the pin 1 annuli 19 and 20 are cut in the recess of sphere 2. End pressure due to the fluid between the sphere and pin is relieved by an annulus 21 and a number of holes 22 connecting this annulus to a low pressure area under the cover 18 which is drained via a flexible pipe 33 to an unpressurized tank. Unbalanced pressures on the outside of the sphere are caused by leakage of fluid from the feed and return ports 3 and 4. In the case of port 4 this unbalanced force is counteracted my machining two shallow recesses 23 and 24 into the outside surface of the sphere in appropriate positions indicated on FIG. 1 and then connecting these recesses via drilled holes to the annulus 19. Unbalanced forces due to the opposite port and dealt with in a similar manner but the shallow recesses are connected to annulus 20.

The lower part of boss 15 is sealed by means of a flexible "boot" 25 to a plate 26 located at the lower end of pin 1. The pin passes through and rotates relative to the plate which is sealed to the pin by means of an "O"-ring 27 or some other suitable seal. Plate 26 carries a drain 34 which is flexibly connected to an unpressurized tank. Leakage of fluid is controlled by using closely fitting moving surfaces and serves a useful purpose by keeping the joint well lubricated thus reducing friction and wear to a minimum.

Steering is allowed by rotation of pin 1 inside sphere 2 and the maximum useable angles are illustrated in FIG. 4a and 4b. Sealing ring 27 imposes a negligible resistance to rotation as it only seals low pressure fluid.

The orientation of the feed and return passages inside the joint and along line b—b ensure that the large angular changes of the upper linkage cause the minimum reduction in port area. This point is illustrated in FIG. 5. Changes in caster angle are only a few degrees and do not significantly reduce the port areas as shown in FIG. 5.

Suspension loads are accommodated by the balljoint and spherical housing and the areas available to resist forces along the axis of the pin are adequate.

FIG. 7 is a perspective view of a suspension arrangement according to the invention. A wheel (not shown) is adapted to be secured to a shaft 37 projecting from the motor 30. In this example the rigid supply pipes 31 and 32 are incorporated in the upper suspension linkage 35 and 36. The lower suspension linkage 38 and 39 is similar to the upper suspension and is intended to be pivoted along the line B — B.

This device provides a means of incorporating an hydrostatic wheel motor into a modern suspension system in which friction and wear are kept to a minimum. The rate of internal leakage at high pressures is acceptable and there is no uncontrolled external leakage. In addition all moving parts are pressure balanced.

The invention is also applicable to suspension systems having fewer degrees of movement than the one described above.

It will be appreciated that although the invention has been described above in relation to an embodiment providing both feed and return of fluid through the upper joint of a suspension, it would be quite possible to divide this flow between an upper and a lower joint or alternatively to provide both flow and return through the lower joint.

Again although described above in relation to a steered and suspended wheel of a vehicle the present invention would be applicable to a nonsteering wheel or a rigidly attached wheel, although in this case its advantages would not be quite so strong.

I claim:

1. A vehicle wheel suspension comprising a hydrostatic motor mounted directly to the wheel, a suspension adapted to permit controlled movement of said wheel in at least one plane, said suspension being of a type which includes two arms, and said arms having passages formed therein for the passage of working fluid, at least one apertured ball joint, each of said arms being connected to said motor via an apertured ball joint, and each apertured ball joint further comprising a ball enclosed in a housing, said housing having at least one port formed therein adapted for cooperation with at least one port formed in said ball to allow passage of working fluid between said motor and each of said arms via said apertured ball joint while permitting movement of said motor and wheel as allowed by said suspension, and said housing being in the form of a rigid upper cover vented to a drain.

2. A vehicle wheel suspension comprising a hydrostatic motor mounted directly to the wheel, a suspension adapted to permit controlled movement of said wheel in at least one plane, said including being of a type which includes to fixed arms, and said arms having passages formed therein for the passage of working fluid, at least one apertured ball joint, each of said arms being connected to said motor via an apertured ball joint, and each apertured ball joint further comprising a ball enclosed in a housing, said housing having at least one port formed therein adapted for cooperation with at least one port formed in said ball to allow passage of working fluid between said motor and each of said arms via said apertured ball joint while permitting movement of said motor and wheel as allowed by said suspension, and a flexible member adapted to seal a space between said housing and said motor, said space being vented to a drain.

3. A vehicle wheel suspension comprising clamped hydrostatic motor mounted directly to the wheel, said suspension being adapted to permit movement of said wheel in at least one plane, said suspension including two arms, said arms being pivoted to fixed structure of the vehicle on a pivoting axis and to said motor, each said arm do a passage formed therein for the passage of working fluid for the motor, said arms being connected to said motor via an apertured ball joint, wherein said apertured ball joint comprises a ball enclosed in a housing said housing and said ball having sealed pairs of ports disposed at extremities of the diameter its said ball parallel with the pivoting axis of said arms to allow passage of working fluid between said motor and said at least one passage via said ball joint while permitting movement of said motor and wheel as allowed by said suspension.

4. A vehicle wheel suspension as claimed in claim 3 and in which one said pair of ports carries flow of said fluid while the other carries return of said fluid.

5. A vehicle wheel suspension as claimed in claim 3 and comprising a rigid flange adapted to seal against said flexible member and to seal against said motor by an "O"-ring seal.

6. A vehicle wheel suspension as claimed in claim 3 and in which there is a swiveling feed joint between said arm and said fixed structure on the pivoting axis of said arm.

7. A vehicle wheel suspension as claimed in claim 3 and in which said ball is restrained against rotating about a vertical axis with respect to said housing in response to steering movements of said wheel.

8. A vehicle wheel suspension as claimed in claim 7 and in which said restraint is effected by a peg projecting from said ball which engages with a vertical slot in said housing.

9. A vehicle wheel suspension as claimed in claim 7 and in which said ball comprises a vertical cylindrical hole into which fits a cylindrical pin adapted to carry said fluid and to rotate with respect to said ball to accommodate steering movements of said wheel.

10. A vehicle wheel suspension as claimed in claim 9 and in which said pin is rigidly attached to said motor.

11. A vehicle wheel suspension as claimed in claim 9 and in which said pin comprises an annular groove in its end face supplied, in use, with said working fluid so as to pressure balance the pin in an axial direction.

12. A vehicle wheel suspension as claimed in claim 9 and in which said pin comprises external annular grooves supplied, in use, with said working fluid so as to pressure balance said pin in a radial direction.

13. A vehicle wheel suspension as claimed in claim 12 and in which said ball comprises recesses in its external surface communicating with said grooves for the flow of said fluid and adapted to balance hydraulic thrust on said ball due to leakage from corresponding ports in said ball and housing.

14. A vehicle wheel suspension as claimed in claim 8 and in which said pin carries axial drillings for said fluid.

15. A vehicle wheel suspension as claimed in claim 14 and in which there are two ports in said pin comprising segmental cutouts, and said axial drillings each communicate with one said cutout, said drillings being blanked off at one end.

16. A vehicle wheel suspension as claimed in claim 9 and in which said ball comprises second ports in the wall of said hold communicating with said first ports, and said pin comprises ports corresponding with the second ports in said ball to permit the flow of fluid therethrough.

17. A vehicle wheel suspension as claimed in claim 16 and in which said ports are of sufficient angular extend with respect to the pin axis to allow said steering movement without substantial reduction of the corresponding port areas.

18. A vehicle wheel suspension as claimed in claim 17 and in which said ports in said pin comprise segmental cutouts from said pin.